United States Patent [19]

Uher

[11] Patent Number: 4,624,619
[45] Date of Patent: Nov. 25, 1986

[54] RETRACTABLE RAMP ASSEMBLY FOR PICK-UP TRUCK

[76] Inventor: Michael L. Uher, P.O. Box 770537, Eagle River, Ak. 99577

[21] Appl. No.: 646,768

[22] Filed: Sep. 4, 1984

[51] Int. Cl.$^4$ .............................................. B65G 67/02
[52] U.S. Cl. ...................................... 414/537; 14/71.1; 296/61; 414/401
[58] Field of Search ............... 414/537, 538, 522, 401, 414/584; 14/71.1, 69.5; 296/61

[56] References Cited

U.S. PATENT DOCUMENTS

| | | |
|---|---|---|
| 2,370,427 | 7/1944 | Sherry . |
| 3,352,440 | 3/1966 | Wilson . |
| 3,511,393 | 12/1968 | Abromavage et al. . |
| 3,613,920 | 10/1971 | Flamm . |
| 3,642,156 | 2/1972 | Stenson . |
| 3,687,314 | 8/1972 | Haugland ........................... 414/522 |
| 3,711,882 | 1/1973 | Iller . |
| 3,763,827 | 10/1973 | Burkart . |
| 3,768,673 | 10/1973 | Nydam et al. . |
| 3,870,170 | 3/1975 | Noble et al. . |
| 3,977,545 | 8/1976 | Lloyd ................................ 414/537 |
| 4,078,678 | 3/1978 | Tordella . |
| 4,198,187 | 4/1980 | Mountz . |
| 4,242,032 | 12/1980 | Whiteman et al. . |
| 4,294,571 | 10/1981 | Tordella . |

*Primary Examiner*—Frank E. Werner
*Attorney, Agent, or Firm*—William D. Hall

[57] ABSTRACT

This invention relates to a retractable ramp assembly installed to a pick-up truck for use in loading heavy objects into the hauling space. An enclosure for the ramp is used to provide a raised platform for the pick-up truck. The ramp has front and rear sections hinged together. The front section has a length about equal to the length of the tailgate (when open) of the truck and the rear section is long as compared to the front section. The retractable ramp is stored in the enclosure. It may be extended to a position wherein the front section rests directly on top of the open tailgate, in which event, the rear section of the ramp extends upwardly or downwardly to a loading surface.

1 Claim, 19 Drawing Figures

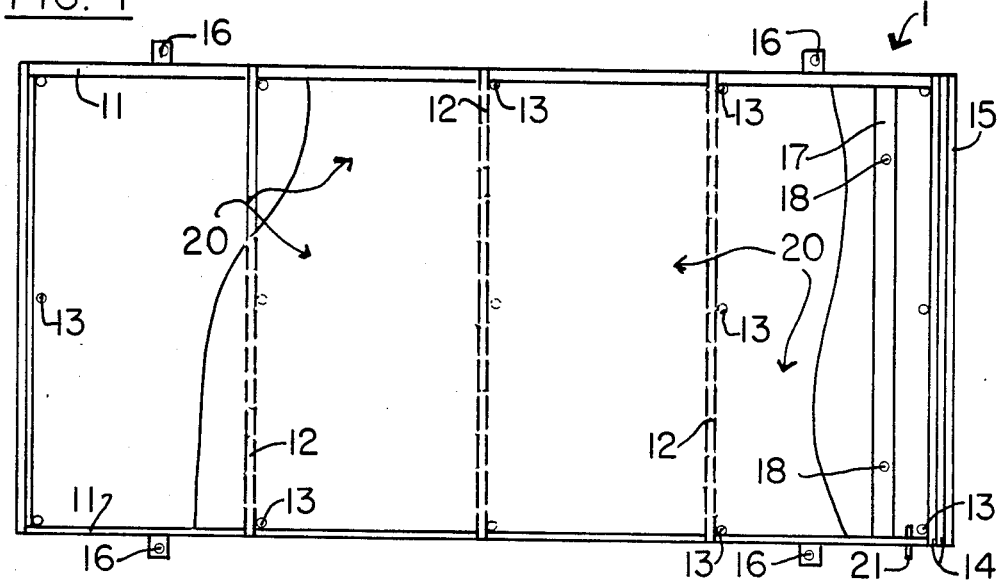
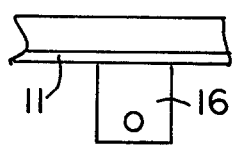
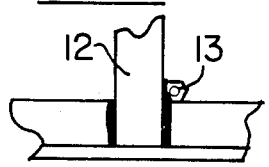
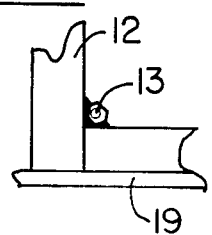
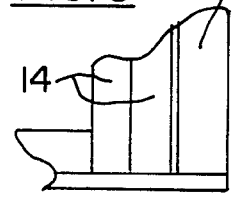
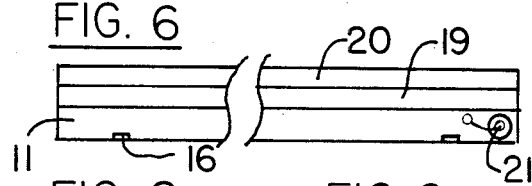
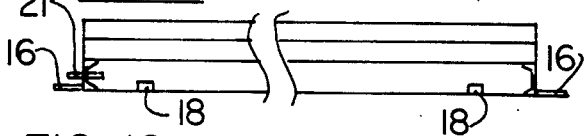
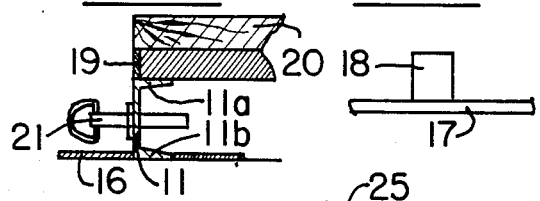
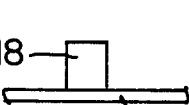
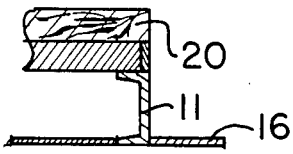
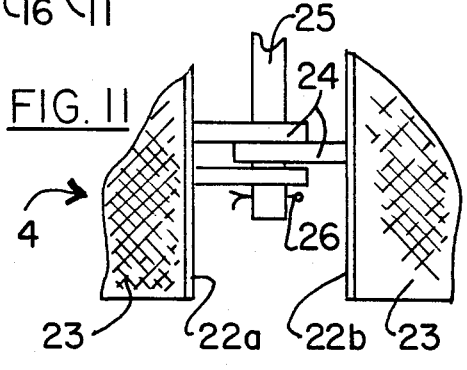
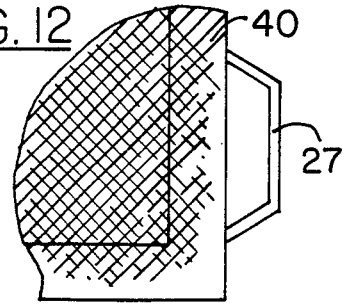

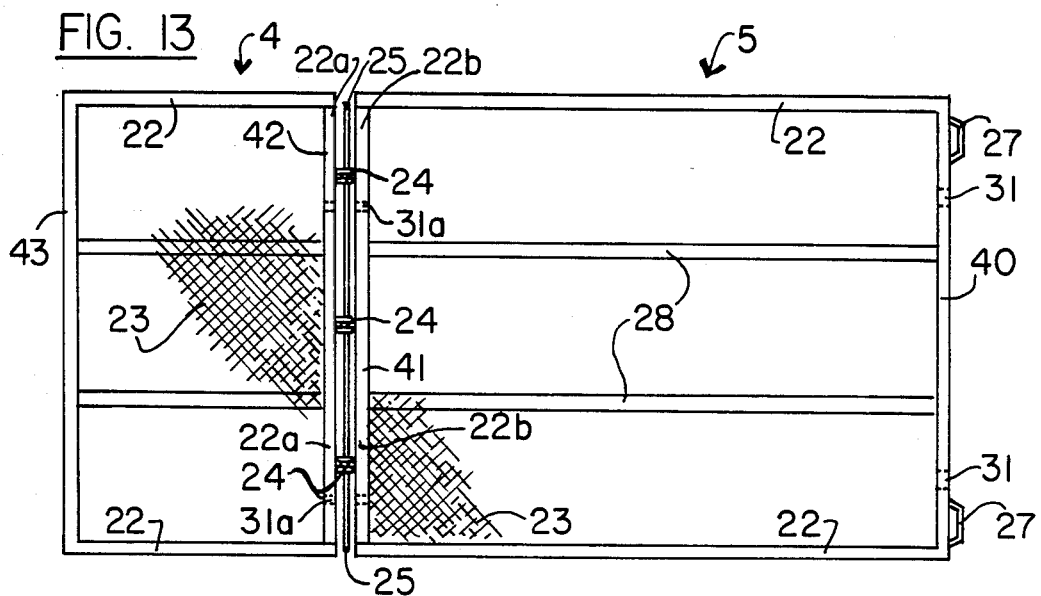

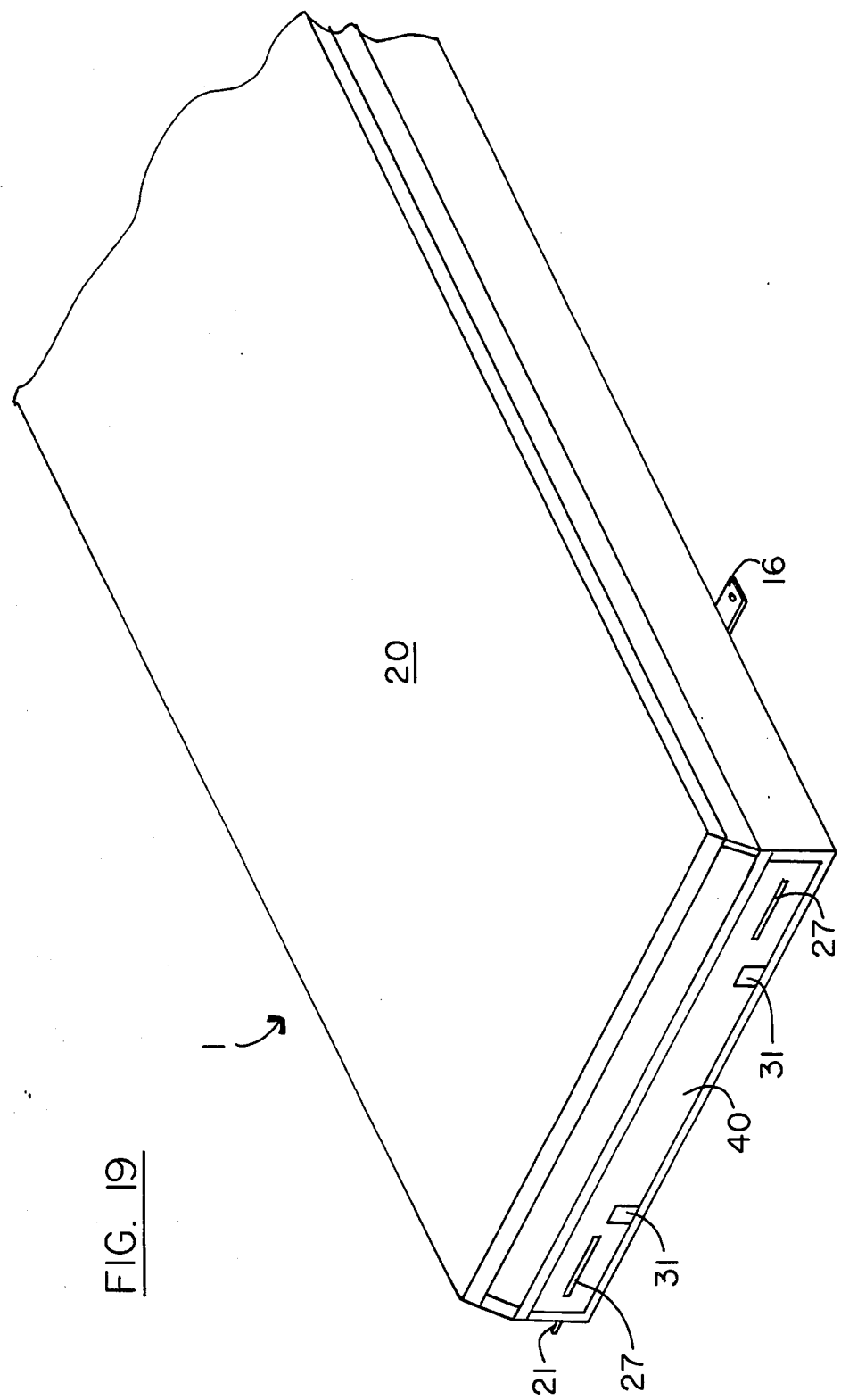

RETRACTABLE RAMP ASSEMBLY FOR PICK-UP TRUCK

BACKGROUND OF THE INVENTION

There has long been a need, by the owners of pick-up trucks, for a simple, inexpensive ramp, free from mechanical difficulties. The transportation of snowmobiles, three wheelers, and other heavy items are common occurrences for the owners of pick-up trucks. Consequently, a retractable ramp operable by a single person is a useful improvement for those people who desire to transport heavy articles. Moreover, it is desirable to minimize the modifications necessary to provide a pick-up truck with a ramp.

U.S. Pat. No. 3,870,170 issued to Noble, Mar. 11, 1975, and entitled: "Loading Ramp for Pick-Up Trucks and the Like" teaches a raised platform in a complex design comprising fixed tracks, movable tracks, a gang plank and rollers. Noble's movable tracks provide a continuous horizontal trackway from the front end of the ramp storage compartment to the rear edge of an opened tailgate. Both Noble's ramp and movable tracks can be retracted far enough so that both the ramp door at the rear end of the raised platform assembly, and the tailgate, may be closed to preserve the exterior appearance of the pick-up truck.

The Noble disclosure does not, however, purport to teach a low-cost ramp for non-commercial use by owners of pick-up trucks, station wagons, etc. Noble's movable tracks and rollers are designed to handle heavy industrial and commercial cargo.

SUMMARY OF THE INVENTION

This invention relates to a retractable ramp and a carrier frame or enclosure therefor adapted to fit within a pick-up truck. The carrier frame or enclosure is rectangular in shape and includes a pair of elongated, separated, U-shape channels connected and supported by a series of transverse intermediate cross-members forming an interior channel into which a hinged ramp operates.

The ramp has two sections with a lateral hinge extending across its entire width connecting the front and rear sections of the ramp. The said hinge permits the front section of the ramp to be supported directly by the tailgate (when the tailgate is open). The rear section of the ramp when pulled out from its enclosure, may be used to provide a passage from the rear end of the tailgate to a loading surface which is at a different level than the tailgate.

BRIEF DESCRIPTION OF THE DRAWINGS

The nature and characteristic features of the invention will be more readily understood from the following description taken in connection with the accompanying drawings forming part hereof in which:

FIG. 1 is a top view of the carrier frame.

FIG. 2 is a top view of a portion of the carrier frame, showing a bracket 16.

FIG. 3 is a detailed view of a portion of the carrier frame.

FIG. 4 is a view of another detail of the carrier frame.

FIG. 5 is a top view of the rear portion of said frame.

FIG. 6 is a side view of the carrier frame.

FIG. 7 is an end view of said frame and the ramp.

FIG. 8 is a detail view of a side rail of the frame together with a pin 21 for locking the ramp in the enclosure or frame 1.

FIG. 9 is a detail view of a pin 18 projecting upwardly from lower cross-member 17.

FIG. 10 is an end view of a portion of side rail 11 of the frame and bracket 16.

FIG. 11 shows the details of a hinge that connects two sections of the ramp.

FIG. 12 shows a portion of the rear end of the ramp and a handle 27 for use in pulling the ramp out of enclosure 1.

FIG. 13 is a top view of the ramp per se without the carrier frame.

FIG. 14 is a side view of the rear end of a pick-up truck with the tailgate down and the ramp extended.

FIG. 15 is a rear end view of the carrier frame showing crossbar 17 and pins 18 projecting therefrom.

FIG. 16 is a detailed view of a pin passing through indent 31 in crossbar 40 of the ramp section 5.

FIG. 17 is a rear end view of the device of the invention shown in connection with the side walls 33 and 34 of a pick-up truck.

FIG. 18 is a detailed view of the parts between the carrier frame and the side wall of the truck.

FIG. 19 is a perspective view of the device embodying the invention, with the ramp stored.

DESCRIPTION OF THE PREFERRED EMBODIMENT

A carrier frame or enclosure 1 is made to fit a pick-up truck, station wagon, or other vehicle having a tailgate. FIG. 1 shows struts or cross-members 12 welded to carrier frame 1 on top of the U-shape channel rails 11. The struts 12 (FIG. 3) running across carrier frame 1 are perpendicular to channel rails 11 and are used to support plywood deck 20 and to strengthen carrier frame 1. Closer spacing, than that shown, of struts 12 may be required to accommodate very heavy loads carried on deck 20.

FIG. 1 also shows two struts 14, of square cross-section, welded side by side at their two ends, on top of the channel rails 11 at a distance of about one inch from the rear end of the carrier frame or enclosure 1. Struts 14 will absorb the impact of heavy objects during loading onto the end of deck 20. A flat bar 15, set at an angle of 45° to the horizontal, is welded along its left edge (FIG. 1) to the top of the solid square struts 14 and along its right edge to the rear end of the carrier frame or enclosure 1. The bar 15, therefore, is an inclined member which is encountered by a load approaching the top of enclosure 1 from the rear of the vehicle. This is to smooth the edge of the deck 20 during loading.

Also shown in FIG. 1 is a flat bar 17 parallel to the struts 14 near the end of the carrier frame 1. The flat bar 17 is perpendicular to the channel rails 11 and extends from one channel rail 11 to the other, and is flush with the bottom of the carrier frame 1, before being welded at both ends to the frame 1. There are two solid round pins 18 welded to the said flat bar 17. The two solid round pins 18 serve as stops to prevent the rectangle ramp 3 from coming all the way out of the carrier frame 1, as explained later.

Also shown in FIG. 1 are securing nuts 13 for the plywood deck 20. The nuts 13 are welded to the struts 12, or to both the struts 12 and the flat bars 19. The flat bars 19 (FIGS. 4 and 6) are welded to the top of the two channel rails 11 representing the two longitudinal sides of frame 1.

The fifteen nuts 13 (FIG. 1) enable the plywood deck 20 to be bolted to the carrier frame 1. The nuts 13 are welded flush with the top of the struts 12 and the flat bars 19. In order to secure the carrier frame 1 onto the pick-up truck bed, four tabs 16 are shown in FIG. 1. The tabs 16 are each provided with a hole so that a bolt can pass through it to secure the frame 1 onto the truck bed. The tabs 16 may be welded to the carrier frame 1.

FIGS. 1, 6, 8, 14, 15, 17 and 19 show the plywood plate 20 which is supported by flat bars 19 and struts 12. The deck 20 serves as a raised platform. When the tailgate 30 is open, as shown in FIG. 14, a removable cylindrical stop pin 21 may be used to hold the ramp 3 inside carrier frame 1 when the ramp is at the extended position. The said removable stop pin 21 is also used when the ramp 3 is in its storage position, to protect the ramp 3 from sliding out of the carrier frame 1.

FIGS. 8 and 10 show the channel irons 11 on edge to create a guide for the ramp 3, permitting the ramp 3 to slide either to storage or to an extended position for use. The ramp 3 is composed of a front section 4 joined by a lateral hinge 24, FIGS. 11 and 13, to a rear section (or ramp section) 5. The frames of both sections 4 and 5 are made of square tubing along three sides. However, the hinged side of the ramp section 5 is also constructed of angle iron 22b as shown on FIGS. 11 and 14.

FIG. 13 relates to the details of construction of the ramp 3. The frame of each of the two sections 4 and 5 of the ramp 3 are made of square tubing 22 along their sides, and cross rails 40 and 41 are angle iron bars. The end pieces 40 and 42 of ramp sections 5 and 4, respectively, are also of square tubing. The hinges 24 attach to bars 22a and 22b (see FIG. 11). Expanded metal wire mesh 23 covers the entire top areas of sections 4 and 5 and is attached to the said sections 4 and 5. The said metal wire mesh is of heavy gauge wire so as to support heavy loads that pass over the ramp 3 and is spaced from the outside edge of the frame to ensure smooth sliding of the ramp 3 inside the carrier frame 1. Also shown in FIG. 11, are hinges 24 used to connect the front and rear sections 4 and 5 of the ramp 3. The hinges 24 have a hole to accept a pin 25 as an axis of rotation. Pin 25 is parallel to 22a and 22b. Hence, the rear section 5 of the ramp may be tilted downward from the rear end of the tailgate 30 toward the ground or it may be tilted upward toward a loading platform. A unique feature of this hinging device 24 is the freedom of the rear section 5 of the ramp 3 to tilt in both directions, so that by tilting upwards the ramp 3 can be used as a platform for loading between the pick-up truck and the elevated loading dock of a warehouse. There are three pairs of hinges 24 shown in FIG. 13, used in the ramp 3 with one pair located in the center and one pair located near each side of the ramp. The pin 25 is a round solid rod. The pin 25 runs through all three pairs of hinges 24, and to make it easy to disconnect the front and rear sections 4 and 5 of the ramp 3, each end of the pin 25 is locked in place with a cotter pin 26 (FIG. 11). Two handles 27 shown in FIGS. 12, 13, 14, 17 and 18 are used for lifting and sliding the ramp 3 with ease.

In FIG. 13 longitudinal supports 28 near the middle of ramp sections 4 and 5 are constructed of square tubing welded to the end pieces 40, 41, 42 and 43 of the front and rear sections 4 and 5 of the ramp 3.

FIG. 14 shows Teflon strips 29 bolted to the inner wall 30 of the tailgate, and the front section 4 of the ramp 3 rests directly on top of the Teflon strips 29 to prevent the ramp from bonding during sliding. Teflon is well known for its smooth surface. The rear section 5 of the ramp 3 is pivoted to section 4 adjacent to the rear end of the tailgate 30. The ramp section 5 may extend from a point near the tailgate to the ground.

If it is desired to load the truck from a loading platform that has an elevation higher than the truck bed, the rear section 5 may be lifted upward to provide a ramp extending from the loading platform to the tailgate 30.

FIG. 19 shows the ramp 3 neatly stored in the enclosure 1, flush with the rear end of the enclosure 1. The ramp 3 is protected from snow, rain, dirt, etc. by enclosure 1. FIG. 17 shows bed fillers having plywood deck 8 used to take up the height difference between the enclosure 1 that is mounted in the pick-up truck and the bottom of the bed. The fillers 8, shown in FIG. 18, are supported by flat bars 31a bent to the contour of the fender wall. The fillers 8 have cross-supports 32, and nuts 33 welded to the mid-points of the cross-supports 32. These nuts 33 enable bolts 36 to hold down the plywood top 20. The fillers 8 are easily attached to or removed from the carrier frame 1. However, the dimensions of bed fillers 8 are selected based upon the size, make and model of the pick-up trucks to be used.

The aforesaid construction holds ramp 3 in operating position under all conditions regardless of the weight of the load. The front end of ramp section 4 is held against excessive upward or downward movement by the upper and lower flanges 11a and 11b, respectively, of side rails 11, of the enclosure 1. These flanges 11a and 11b, therefore, prevent front section 4 of ramp 3 from moving upward when a heavy load starts up ramp section 5 (See FIG. 14).

As shown in FIGS. 15 and 16, the end rail 40 (which is composed of square tubing) of ramp section 5, has indents 31 (FIGS. 15, 16) so that stop pins 18, projecting upward from rail 17, will not interfere with rearward movement (movement to the right in FIGS. 1 and 13) of ramp sections 4 and 5. Similarly, the other cross-rails 41 and 42 of ramp 3 have indents 31a similar to indent 31. However, the front cross-rail 43 of front ramp section 4 does not have any such indents. Therefore, the ramp sections 4 and 5 may be freely pulled rearward of the truck until the cross-rail 43 engages stop pins 18. These pins then stop further rearward movement of the ramp 3.

The indents 31 in end rail 40 may be omitted in the event that stop pins 18 are mounted forward (toward the front of the truck) of the end rail 40.

The enclosure 1 (FIG. 1) is not as wide as the bed of the pick-up truck. It is desirable that the upper deck 20 of the enclosure 1 extend from one inside wall 33 of the truck to the other inside wall 34. To fill in the spaces between deck 32 and the inside walls of the truck, end pieces 8 are added. They are securely attached to and supported by enclosure 1 in any suitable manner.

The two channels 11 and their flanges 11a and 11b form a guideway for the ramp 3 (FIG. 13). Those channels 11 are spaced apart slightly more than the width of the ramp 3, and the flanges 11a and 11b pass directly above and below, respectively, limited portions of the ramp 3 (See FIG. 7).

I claim to have invented:

1. In a vehicle of the type having a generally horizontal bed supported by wheels; said bed having a rear end; a tailgate hinged to said rear end of said bed, for angular movement from a closed to an open position; said tailgate having an inner wall and also having a free end which constitutes a rear end when the tailgate is open; and means which limits the angular movement of said tailgate, as it is opened, to a position in which said inner wall lies horizontal and in the same plane as said bed and as a continuation of said bed;

relatively flat elongated ramp means movable from a first position on said bed to a second position in which at least a portion of said elongated ramp means extends beyond said tailgate while said tailgate is open, said elongated means when in said first position being sufficiently small that it is located wholly within the vehicle when the tailgate is closed;

said elongated ramp means having a first section having a rear end which is at least as far rearwardly as said rear end of said tailgate, when the elongated means is in said second position, said first section being positioned flush with said inner wall of said tailgate when said elongated means is in said second position, said elongated ramp means also having a ramp section having front and rear ends, said elongated ramp means also including hinge means connecting the rear end of said first section to the front end of said ramp section, so that when the elongated means is in said second position the ramp section is movable to a position wherein the rear end of said ramp section is at a different level than the front end of said ramp section whereby to form a ramp, whereby said elongated means may be stored above the bed of said vehicle when the tailgate is closed, and whereby when the tailgate is open the elongated means may be moved to said second position in which said ramp section constitutes a ramp, said elongated means including means in which the rear section of the ramp may be swung downward to provide a ramp from the ground to the vehicle, or may be swung upwardly to provide a ramp extending downwardly from an elevated dock to the vehicle, and limit means to limit upward movement of said first section when said elongated ramp means is in said second position, said limit means comprising: a side rail along one side of said elongated ramp means having a flange above said elongated ramp means, and a second side rail along the other side of said elongated ramp means having a flange above said elongated ramp means, whereby to provide a guide for said elongated ramp means and to limit upward and downward movement thereof, and an element which locks said elongated means to (a) restrain both forward and rearward motion of said elongated means when it is in said second position, and (b) to insure that at least one of said flanges on at least one of said side rails limits the upward travel of said first section of said elongated ramp means, said element comprising pin locking means that passes through said elongated means and one of said side rails, and stop means for limiting the rearward travel of said elongated ramp means to thereby insure that at least one of the flanges on at least one of said side rails limits the upward travel of said first section of said elongated ramp means, said pin locking means also holding said elongated means in said first position after it has been moved to said first position.

\* \* \* \* \*